United States Patent
Reis et al.

(10) Patent No.: US 10,742,309 B2
(45) Date of Patent: Aug. 11, 2020

(54) SPATIAL ROUTER WITH DYNAMIC QUEUES

(71) Applicant: HIGHER GROUND LLC, Palo Alto, CA (US)

(72) Inventors: Robert Reis, Palo Alto, CA (US); Darren Reis, Palo Alto, CA (US); Shmuel Shaffer, Palo Alto, CA (US)

(73) Assignee: HIGHER GROUND LLC, Palo Alto, CA (US)

( * ) Notice: Subject to any disclaimer, the term of this patent is extended or adjusted under 35 U.S.C. 154(b) by 38 days.

(21) Appl. No.: 15/622,416

(22) Filed: Jun. 14, 2017

(65) Prior Publication Data

US 2018/0367212 A1    Dec. 20, 2018

(51) Int. Cl.
*H04B 7/185* (2006.01)
*H04L 12/863* (2013.01)
*H04W 16/28* (2009.01)

(52) U.S. Cl.
CPC ......... *H04B 7/18513* (2013.01); *H04L 47/62* (2013.01); *H04W 16/28* (2013.01)

(58) Field of Classification Search
None
See application file for complete search history.

(56) References Cited

U.S. PATENT DOCUMENTS

| | | | | |
|---|---|---|---|---|
| 5,583,774 A * | 12/1996 | Diesel | ................... | G01C 21/165 701/536 |
| 5,977,910 A | 11/1999 | Matthews | | |
| 6,920,323 B1 * | 7/2005 | Grayson | ............ | H04B 7/18534 370/324 |
| 2003/0032427 A1 | 2/2003 | Walsh et al. | | |
| 2006/0178142 A1 * | 8/2006 | Lovberg | .................... | H04B 1/38 455/431 |
| 2006/0221909 A1 * | 10/2006 | Farineau | ............ | H04B 7/18543 370/336 |
| 2008/0144815 A1 * | 6/2008 | Richards | .................. | H04K 1/00 380/34 |

(Continued)

FOREIGN PATENT DOCUMENTS

EP    1906578 A2    4/2008

OTHER PUBLICATIONS

ETSI TS 102 464 V1.1.1 "Satellite Earth Stations and Systems (SES); Broadband Satellite Multimedia (BSM); Interworking with DiffServ Qos" Jan. 2007 (38 pages).

(Continued)

*Primary Examiner* — Robert M Morlan
*Assistant Examiner* — Rodrick Mak
(74) *Attorney, Agent, or Firm* — Jason H. Vick; Sheridan Ross, PC

(57) ABSTRACT

Fifty seven percent of the world's population, some 4.2 billion people, reside in places without internet access. Consequently, these areas also have no or limited infrastructure to deploy Internet of Things (IoT) devices/sensors. Numerous companies are racing to fill this communication gap and provide internet not only to those without internet but to also improve and provide additional options to those with internet access. One exemplary aspect is capable of providing a technically unique lower-cost solution for internet connectivity, and in particular for applications requiring real-time and/or near-real-time connectivity.

21 Claims, 8 Drawing Sheets

(56) References Cited

U.S. PATENT DOCUMENTS

| | | | | |
|---|---|---|---|---|
| 2011/0234455 | A1* | 9/2011 | Rosenfeld | G01S 19/25 342/357.31 |
| 2011/0291889 | A1 | 12/2011 | Mayo | |
| 2013/0039442 | A1* | 2/2013 | Smallcomb | H04L 1/007 375/308 |
| 2013/0149970 | A1* | 6/2013 | Durick | H04W 24/02 455/67.11 |
| 2016/0121204 | A1* | 5/2016 | Shen | B25J 9/163 463/40 |
| 2016/0204866 | A1* | 7/2016 | Boroson | H04B 10/1121 398/97 |
| 2016/0258759 | A1* | 9/2016 | Matthews | G01S 19/42 |
| 2016/0353467 | A1* | 12/2016 | Nekovee | H04L 5/0048 |
| 2017/0111102 | A1* | 4/2017 | Fan | H04B 7/18504 |
| 2017/0171762 | A1 | 6/2017 | Reis et al. | |
| 2017/0171868 | A1 | 6/2017 | Reis et al. | |
| 2017/0195483 | A1* | 7/2017 | Gault | H04M 3/42289 |
| 2018/0152235 | A1* | 5/2018 | Smoot | H04B 7/18506 |

OTHER PUBLICATIONS

International Search Report for International Application No. PCT/US2017/037417, dated Mar. 6, 2018.
Written Opinion for International Application No. PCT/US2017/037417, dated Mar. 6, 2018.
U.S. Appl. No. 15/455,687, filed Mar. 10, 2017, Reis et al.
U.S. Appl. No. 15/455,775, filed Mar. 10, 2017, Reis et al.
U.S. Appl. No. 15/581,419, filed Apr. 28, 2017, Reis et al.
U.S. Appl. No. 15/611,022, filed Jun. 1, 2017, Reis et al.
Wikipedia "Queue (Abstract Data Type)" Available at: https://en.wikipedia.org/wiki/Queue_(abstract_data_type); Printed Jun. 28, 2017.
International Preliminary Report on Patentability for International Application No. PCT/US2017/037417, dated Dec. 26, 2019.

* cited by examiner

SPATIAL ROUTER WITH DYNAMIC QUEUES

TECHNICAL FIELD

An exemplary aspect is directed toward communications systems. More specifically an exemplary aspect is directed toward wireless communications systems and even more specifically to wireless networks and satellite communications. Even more particularly, an exemplary aspect is directed toward wireless networks and the use of dynamic queues for wireless Internet connectivity.

BACKGROUND

Fifty seven percent of the world's population, some 4.2 billion people, reside in places without internet access. Consequently, these areas also have no or limited infrastructure to deploy Internet of Things (IoT) devices/sensors. Numerous companies are racing to fill this communication gap and provide internet not only to those without internet but to also improve and provide additional options to those with internet access.

SpaceX® outlined a plan to launch a high-speed, reliable and affordable broadband internet to users in the U.S. and around the world using a network of 4,425 internet-beaming satellites at a cost of US $10 billion.

OneWeb®, formerly known as WorldVu™, proposes to deploy a constellation of approximately 648 satellites which are expected to provide global Internet broadband service to individual consumers as early as 2019. The system is planned to operate in the Ku band (both for transmitting and receiving). Most of the capacity of the initial 648 satellites has been sold, and OneWeb® is considering nearly quadrupling the size of the satellite constellation by adding 1,972 additional satellites, each satellite with a cost of less than US$500,000.

Facebook® outlined a plan to provide internet services to remote areas using a large scale drone deployment, code name Aquilas. The drones would fly at an altitude of 60,000 to 90,000 feet. This system is envisioned to comprise thousands of internet-beaming drones capable of communicating with end devices, ground stations, and with each other.

Google® has two parallel efforts underway with a similar goal of delivering high speed internet access. Project Skybender™, is based on high altitude drones while project Loon™ aims to deliver internet connectivity via high-altitude balloons as a basis for the infrastructure.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

While the abovementioned projects intend to deliver high speed real-time communication capabilities to every corner of the globe at high cost, one exemplary technology disclosed herein is capable of providing a technically unique lower-cost solution for Internet connectivity, and in particular for applications requiring real-time and/or near-real-time connectivity.

For example, and in addition to basic internet connectivity, numerous diverse fields could benefit from sensor deployment by making these sensors connectable to the internet. These fields include, but are not limited to, smart grid technologies, agriculture, security, industrial, hydrocarbon exploration, government, national security, etc. As many of these fields include devices, such as sensors, placed in remote locations, a clear technological benefit can be realized by the technology described herein. In essence, by providing a communications infrastructure to these remote locations, one exemplary embodiment expands the feasibility of using devices and/or sensors in remote areas which are not currently served by internet connectivity. Examples of these devices and/or sensors include, but are not limited to, industrial sensors, agricultural sensors, security sensors, geologic sensors, weather sensors, livestock sensors, tracking sensors, governmental sensors, monitoring sensors, energy sensors, Internet of Things (IoT) devices/sensors, hydrocarbon extraction sensors, oil/gas well sensors, communications devices and/or the like.

Figure 1:
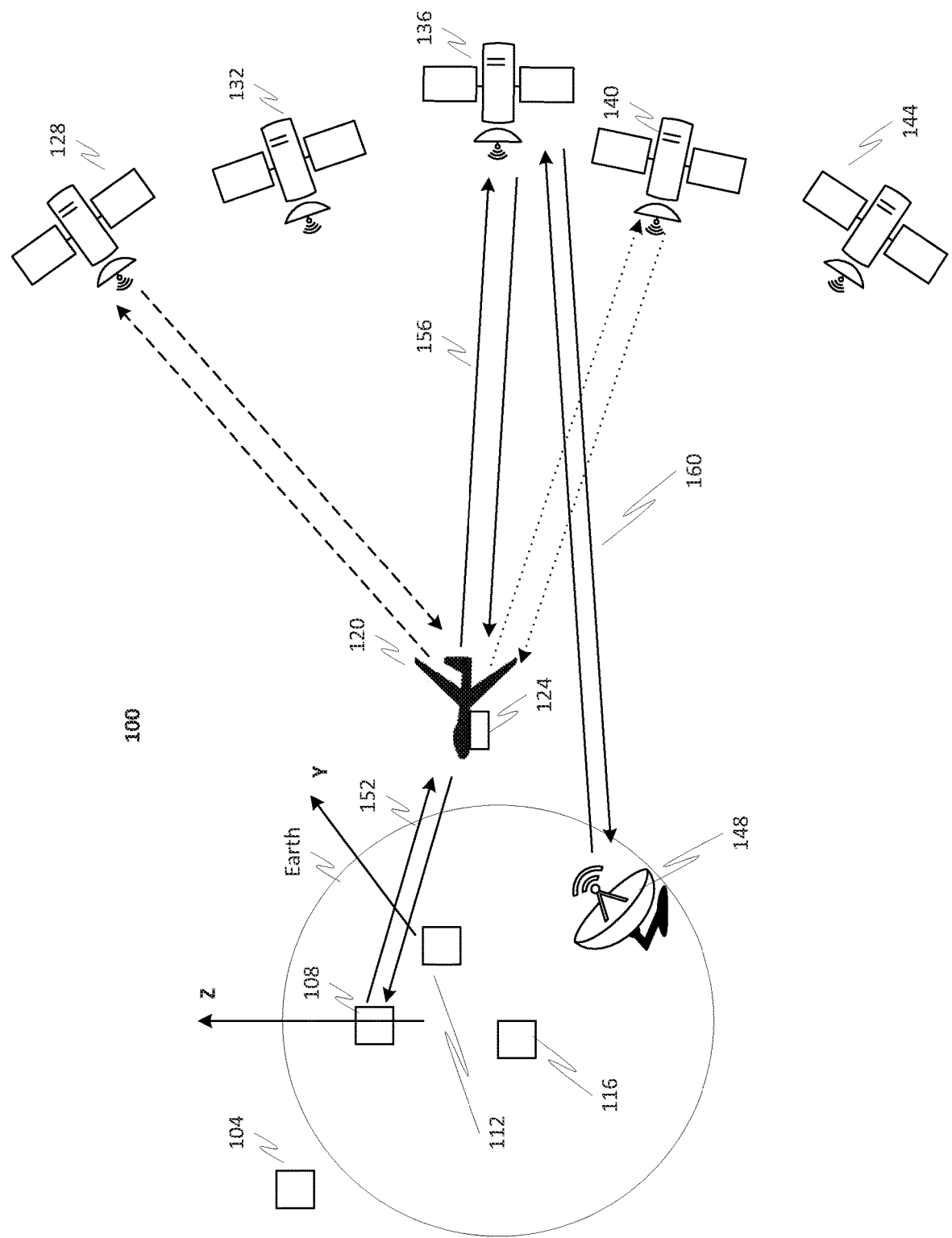
FIG. 1 illustrates an exemplary simplified view of a system for providing internet connectivity to devices/objects in accordance with some embodiments.

FIG. 1 provides a simplified description of a system 100 that is capable of providing internet connectivity to devices/objects with communications units in accordance with one embodiment. The system infrastructure includes communication devices/sensors with associated communications units 104-116, one or more low flying drones 120 (only one is shown), spatial router 124 mounted on the drone, optional GEO satellites 128-144, optional LEO and optional other satellites (such as private satellites) (not shown), and ground stations 148 (only one is shown).

Drones are Unmanned Aerial Vehicles (UAV) which are aircraft that do not have a human pilot on the aircraft (but may be remotely controlled by a pilot). UAVs are typically part of an unmanned aircraft system (UAS) which includes one or more UAV(s), a ground-based controller/navigation system, and radios between the two. UAVs are capable of operating with various degrees of autonomy including either under remote control by a human pilot or autonomously/semi-autonomously by onboard computers and associated navigation componentry.

The drone(s) 120 fly over objects/devices/sensors, such as IoT devices, equipped with communication units 104-116 and at least receive information using commercially available Low Power Wide Area Network (LPAN) protocols such as, but not limited to, LoRaWAN™, ZigBee®, etc., with other communications protocols capable of being used with similar success.

Because an exemplary embodiment communicates information from ground objects/devices/sensors to the low flying drones, rather than to high altitude orbiting satellites or high flying drones, the system requires lower power and can use lower cost components than those required for the solutions described in the background.

The drone 120 relays the information to one of multiple satellites, such as satellite 136, over satellite link 156, and the satellite 136 completes the path to the internet connected ground station 148 over communications link 160.

Figure 2:
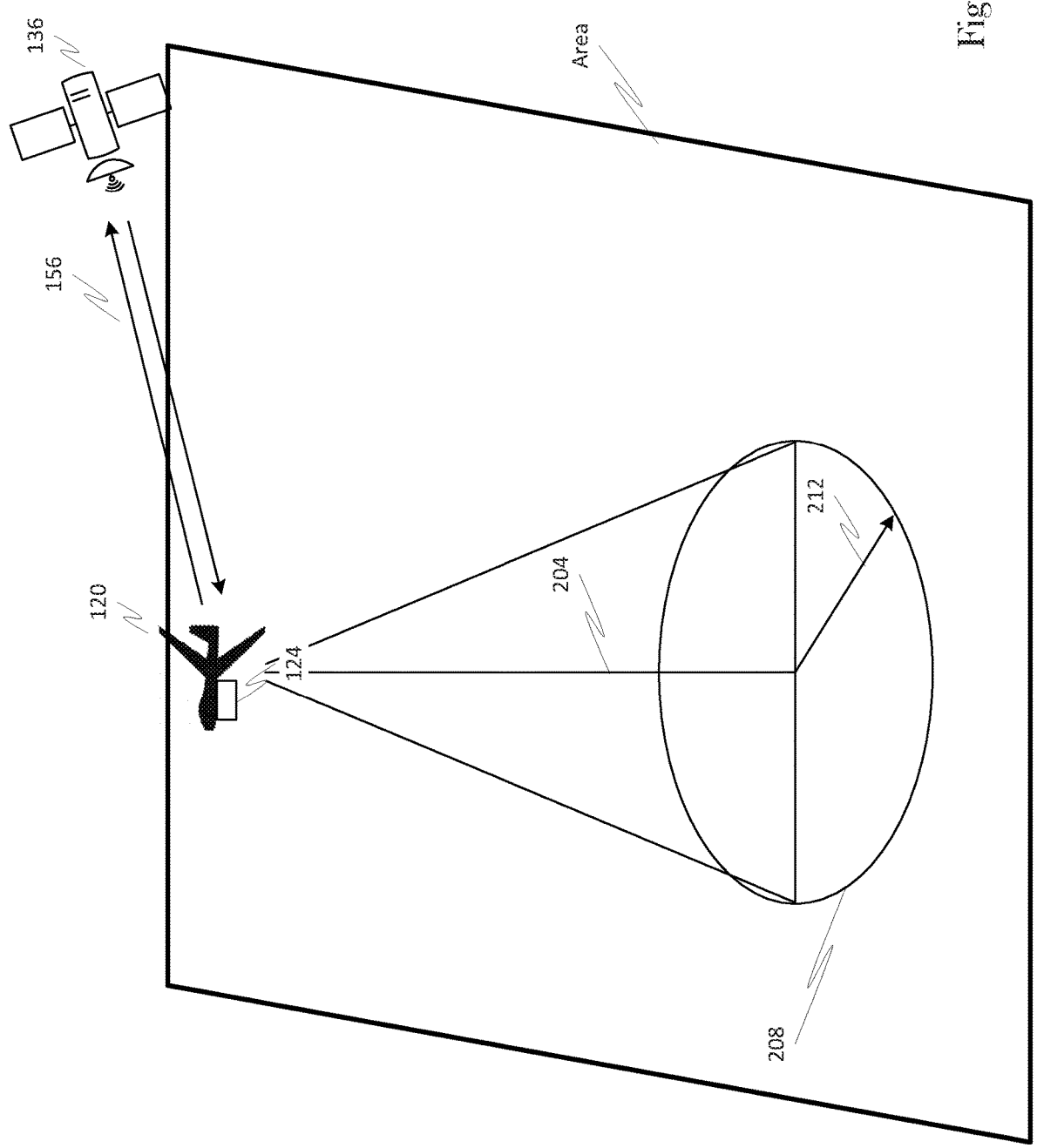
FIG. 2 illustrates another example of the deployed system in accordance with some embodiments.

FIG. 2 provides another view of the system in accordance with another embodiment. The area, for which a drone 120 flying at altitude 204 may provide internet connectivity, can be approximated by a circle 208 of radius R 212. See Equation (1).

$$R = \operatorname{sqrt}(2*h) \qquad \text{Equation (1)}$$

Where:
R is the radius of the area in miles, and h is the altitude of the drone 120 above ground. For example a drone flying at an altitude of 500 ft. may be able to service an area with a radius of sqrt (2*500)=~31 miles (~50 km).

Unlike the solutions that use high flying satellites, drones, or balloons to provide wide area coverage, each drone in an exemplary embodiment provides a solution to smaller focused areas of interest with specific communications needs. For example, a low flying drone at 400 feet can provide service to a ground area with a 28 mile radius. Communications 152 between a device, such as an IoT device, on the ground and a low-flying drone could operate in either a direct-link mode or in a store-and-forward mode. The direct link mode requires that at any time a drone would be in the air above the area where the IoT devices are deployed. With the store-and-forward mode, the IoT device needs to collect and store information until a drone flies over the area of interest, establishes communication with the IoT device, and collects the stored information for forwarding to one or more destinations.

The low-flying drones 120 can provide the IoT devices with internet connectivity via a satellite communication link 156 and a ground station 148. In this aspect, the drones 120 can provide a near-earth relay between the IoT devices and the satellite(s). In accordance with one exemplary embodiment, the drones 120 can use a low-cost GEO satellite link, however those skilled in the art should recognize that LEO or any other satellite(s) with a corresponding link could also be used.

Internet connectivity for the units 104-116 can be provided via any one of numerous available satellites. The specific satellite and the path through which to deliver given information is selected based on various criteria. For example, information that requires real-time delivery may select a path via lower latency LEO satellites; communication that is cost sensitive may be delivered via GEO satellites, and sensitive information may be delivered via specific private satellites. To this end, there is a need to redirect signals from the drone along one out of numerous spatial paths to an appropriate satellite.

The drone may optionally store the information from an IoT device in an onboard spatial router which includes a store-and-forward queue system. The information may be stored in any of the various output queues intended for delivery over the plurality of satellite paths according to the specific characteristics of the data and/or according to the availability of the various satellite links. For example, some satellite links may be available from specific drone GPS positions and not available from others. Additionally, communication with a specific satellite may be prohibited from a specific drone GPS position as it may interfere with other unintended receivers such as receivers of other satellites and/or incumbent ground receivers. In this aspect, the queues in the store and forward process can be established and arranged in accordance with the available satellite communication links.

At any time, the store and forward queues may be rearranged so as to mirror the availability of the various communication paths via the various satellites. The queues discussed herein in more detail hereinafter may be implemented at least using a Java LinkList, PriorityQueue, Queue classes, Queue Interface or by any other well-known methods in Java® or other suitable languages.

One exemplary operational process of the spatial router 124 includes calculation of the time it would take to send all messages from a specific queue before the intended satellite becomes unavailable. In accordance with one embodiment, the amount of information stored in the queue is limited to the information that could be sent to the intended satellite while it is available (including margins to facilitate retransmissions/error correction, etc.). In accordance with yet another embodiment, the trajectory of the drone can be modified to ensure satellite availability that matches (or tries to match) the amount of data in a specific queue(s) to be transmitted.

In accordance with one exemplary embodiment, the drone carries onboard a spatial router 124 which determines at any time the information that should be transmitted next from which queue and towards which satellite. For example, a priority scheme may be established to ensure that higher priority data (e.g., data requiring real-time service or near-real time service) may be transmitted first towards a LEO satellite. In accordance with another example, the priority of transmitting towards a specific satellite may be increased if the drone is on a trajectory that would deem the intended satellite to become non-accessible in a short time (either because of loss of line of sight to the satellite or because transmission may cause interference). In accordance with yet another example, the spatial router may allocate specific time slots for each spatial path towards different satellites according to the size of the data in each queue and the speed of the associated link, and then spatially redirect the antenna of the drone to transmit information to the appropriate satellite allocated to a specific time-slot.

Different than all other forms of routing, the spatial router sends information along a specific and dynamically-adjustable, physical radio path appropriate to the desired route. All other routers send information either along a) a wired path which may consist of one or more discrete routes or b) a wireless path in which the physical radio path is generally omni-directional and the routed path is chosen by the address field in the data, seeable by all. The spatial router, on the other hand, selects a path via a chosen 3-D spatial direction that is likely to be dynamically-changing and/or not discrete due to one or more of the movement of the drone and/or the movement of the satellite(s) and/or the type and/or amount of data in a queue.

Figure 3:
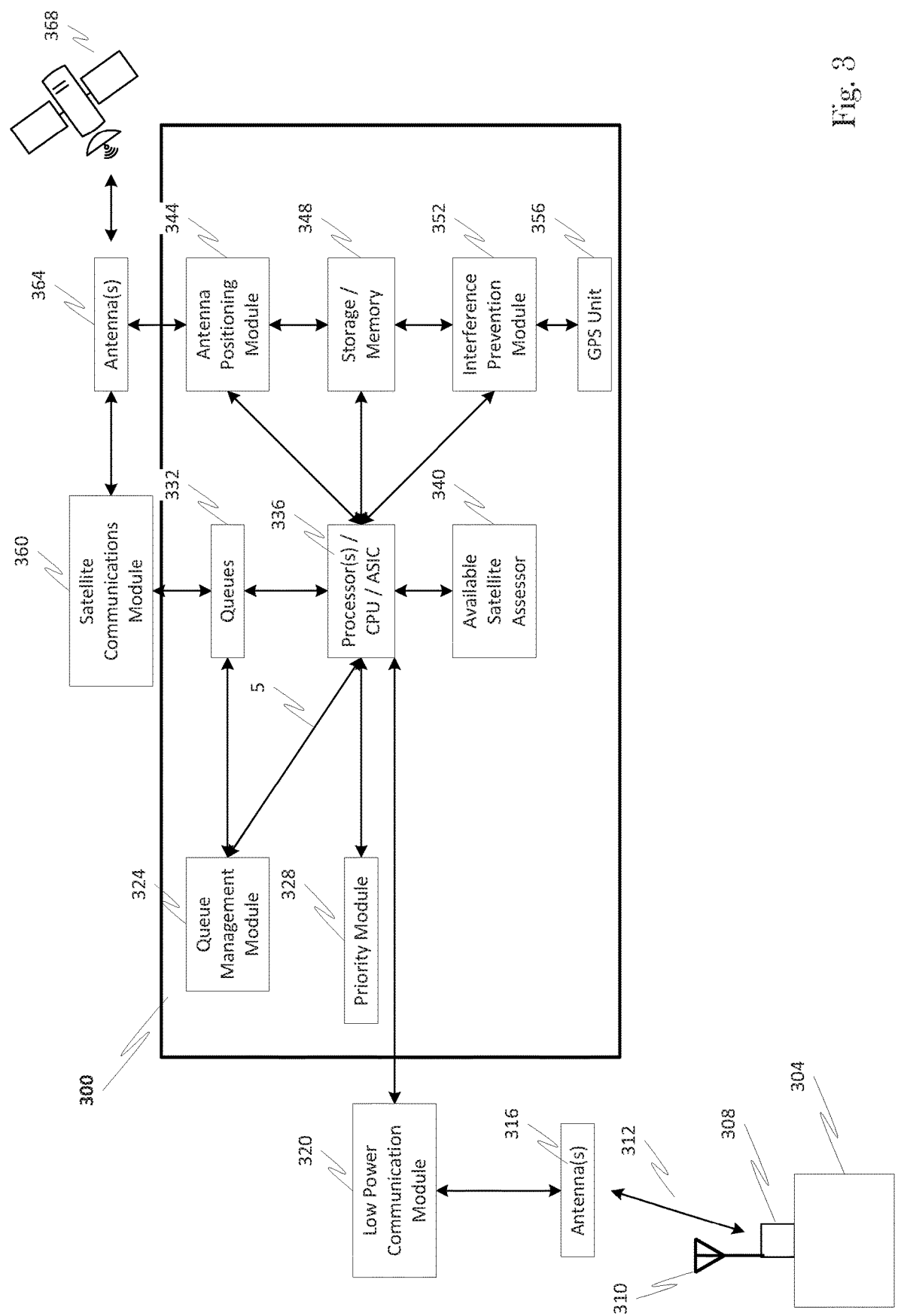
FIG. 3 illustrates an exemplary aerial vehicle-based spatial router in accordance with some embodiments.

FIG. 3 provides a simplified block diagram 300 of the airborne spatial router 124 of FIG. 1 that can be carried on a drone or other aerial vehicle (manned or unmanned). While not illustrated, the drone can include one or more of a power supply (e.g., battery, solar, fuel source), navigation components (autonomous/semi-autonomous/manual), propulsion means (e.g., propeller(s)), a GPS receiver, a camera, cargo carrying capabilities, Wi-Fi communications capabilities and/or Bluetooth® or other communications capabilities.

The spatial router 300 includes one or more antennas 316 associated with a low power communications module 320, a queue management module 324, a priority module 328, one or more queues 332, a processor/CPU 336, an available satellite assessor 340, antenna positioning module 344, memory/storage 348, an interference prevention module 352, GPS (Global Position System) unit/module 356, a satellite communications module 360 and one more associated antennas 364, all interconnected by links 5.

The spatial router 300 is capable of being in communication with a device/sensor 304 which includes a low power communications unit 308 and associated antenna 310 over wireless link 312, and with a satellite 368 via satellite communications module 360 and antenna 364. Operation will be discussed in relation to the components in FIG. 3 appreciating that each separate device in a system, e.g., device, spatial router, satellite, etc., can include one or more of the components shown in the figure, with the components each being optional and each capable of being collocated on a single device or non-collocated and distributed over a plurality of devices. Each of the components in FIG. 3 can optionally be merged with one or more of the other components described herein, or into a new component(s). Additionally, it is to be appreciated that some of the components may have partially overlapping functionality. Similarly, all or a portion of the functionality of a component can optionally be merged with one or more of the other components described herein, or into a new component(s). Additionally, one or more of the components illustrated in FIG. 3 can be optionally implemented partially or fully in, for example, a baseband portion of a wireless communications device such as in an analog and/or digital baseband system and/or baseband signal processor, that is typically in communication with a radio frequency (RF) system. The baseband signal processor could optionally be implemented in one or more FPGAs (Field Programmable Gate Arrays).

Furthermore, in the illustrative but non-limiting embodiment, real-world satellites may be used, such as the Galaxy 3-C satellite at 95.05° W.L., Galaxy 12 satellite at 129° 10 W.L., and Galaxy 19 satellite at 97° W.L. Each of these three Galaxy satellites currently communicate with one of three gateway/remote control earth stations in Napa, Calif. (Call Sign E970391), and Hagerstown, Md. (Call Signs E050048 and E050049), and operate on C-band frequencies in the 3700-4200 MHz (downlink I space-to-Earth) and 5925-6425 MHz (uplink I Earth-to-space) bands. Notably, any satellites, satellite systems, communication frequencies, ground stations, etc., may be used in accordance with the techniques herein, and those illustrated herein are merely for use as an example implementation of an illustrative embodiment, and are not meant to be limiting to the scope of the present disclosure.

The one more antennas 310/316/364 can be used for wireless communications over one or more wireless links in conjunction with the low power communication module 320 and satellite communications module 360. The wireless communication can be in accordance with technologies such as LPWAN, multi-input multi-output (MIMO) communications, multi-user multi-input multi-output (MU-MIMO) communications, Bluetooth®, LTE, RFID, 4G, 5G, LTE, LWA, LP communications, Wi-Fi, etc. In general, the antenna(s) discussed herein can include, but are not limited to one or more of directional antennas, omnidirectional antennas, monopoles, patch antennas, loop antennas, microstrip antennas, dipoles, multi-element antennas, phased array, and any other antenna(s) suitable for communication transmission/reception. In an exemplary embodiment, transmission/reception may require a particular antenna spacing or placement on a device. In another exemplary embodiment, the type of transmission/reception can require spatial diversity allowing for different channel characteristics at each of the antennas.

Example wireless links, therefore, may specifically include, but are not limited to, radio communication links, near-field-based communication links, Wi-Fi communication links, satellite communication links, cellular communication links, infrared communication links, microwave communication links, optical communication (light/laser-based) links, combinations thereof, or the like.

The antenna(s) generally interact with an Analog Front End (AFE) (not shown), which is used to enable the correct processing of the received modulated signal and signal conditioning for a transmitted signal. The AFE can be functionally located between the antenna and a digital baseband system in order to convert the analog signal into a digital signal for processing and vice-versa.

The CPU/controller/microprocessor 336 can be connected to the memory/storage/cache 348. The router 300 components can interact with the memory/storage/cache 348 which may store information and operations necessary for configuring and transmitting or receiving the information described herein and/or operating the device as described herein. The memory/storage/cache 348 may also be used in connection with the execution of application programming or instructions by the controller/microprocessor 336, and for temporary or long term storage of program instructions and/or data. As examples, the memory/storage/cache 348 may comprise a computer-readable device, RAM, ROM, DRAM, SDRAM, HD, and/or other storage device(s) and media.

The controller/processor 336 may comprise a general purpose programmable processor or controller for executing application programming or instructions related to the device 300. Furthermore, the controller/microprocessor 336 can perform operations for configuring and transmitting information as described herein. The controller/microprocessor 336 may include multiple processor cores, and/or implement multiple virtual processors. Optionally, the controller/microprocessor 336 may include multiple physical processors. By way of example, the controller/microprocessor 336 may comprise one or more of a specially configured Application Specific Integrated Circuit (ASIC) or other integrated circuit, a digital signal processor(s), a controller, a hardwired electronic or logic circuit, a programmable logic device or gate array, a special purpose computer, and/or the like, to perform the functionality described herein.

Each of the devices 308, 320 and 360 can further include a transmitter(s) radio circuit and receiver(s) radio circuit which can transmit and receive signals, respectively, to and from other wireless devices and/or satellites using the one or more antennas. Optionally included in each of the devices 308, 320 and 360 is a medium access control or MAC module/circuitry and PHY circuitry.

The MAC module can provide control for accessing the wireless medium between the devices. In an exemplary embodiment, the MAC circuitry may be arranged to contend for the wireless medium and configure frames or packets for communicating over the wireless medium as discussed.

The PHY module controls the electrical and physical specifications for communications. In particular, PHY module manages the relationship between the devices and the transmission medium. Primary functions and services performed by the physical layer, and in particular the PHY module, include the establishment and termination of a connection to a communications medium, and participation in the various process and technologies where communication resources are shared between, for example, multiple devices. These technologies further include, for example, contention resolution and flow control and modulation/demodulation or conversion between a representation of digital data in the devices/sensors and the corresponding signals transmitted over the communications channel. These signals are transmitted over a radio communications (wireless) link. The physical layer of the OSI model and the PHY module/circuitry can be embodied as a plurality of sub components. These sub components and/or circuits can include a Physical Layer Convergence Procedure (PLCP) which can act as an adaptation layer. The PLCP is at least responsible for the Clear Channel Assessment (CCA) and building packets for different physical layer technologies. The Physical Medium Dependent (PMD) layer specifies modulation and coding techniques used by the device and a PHY management layer manages channel tuning and the like. A station management sub layer and the MAC circuitry can also handle coordination of interactions between the MAC and PHY layers at the various transceivers.

The MAC layer and components, and in particular the MAC circuitry can provide functional and procedural means to transfer data between the entities and to detect and possibly correct errors that may occur in the physical layer. The MAC circuitry also can provide access to contention-based and contention-free traffic on different types of physical layers, such as when multiple communications technologies are incorporated into one or more of the devices. In the MAC, the responsibilities are divided into the MAC sub-layer and the MAC management sub-layer. The MAC sub-layer defines access mechanisms and packet formats while the MAC management sub-layer defines power management, security and roaming services, etc.

The spatial router 300 and/or one of the other components can also optionally contain a security module (not shown). This security module can contain information regarding but not limited to, security parameters required to connect the low power communication unit 308 to the spatial router 300 or other device or other available network(s), and can include WEP or WPA/WPA-2 (optionally+AES and/or TKIP) security access keys, network keys, etc. Security access keys are a security password used by networks. Knowledge of this code can enable a wireless device to exchange information with another device. The information exchange can occur through encoded messages with the WEP access code often being chosen by a network administrator. WPA is an added security standard that is also used in conjunction with network connectivity with stronger encryption than WEP.

The devices can also optionally contain an interleaver/deinterleaver that can perform interleaving and/or deinterleaving functions to, for example, assist with error correction. A modulator/demodulator can perform modulation and/or demodulation functions such as OFDM, QPSK, QAM, or other modulation/demodulaton techniques, etc. An encoder/decoder can perform various types of encoding/decoding of data. A scrambler can optionally be used for data encoding. A multiplexer/demultiplexer can provide multiplexing and demultiplexing services, such as spatial multiplexing.

In operation, the device/sensor 304, such as an IoT device, equipped with the low power communication unit 308 and associated antenna 310 (such as unit 108 of FIG. 1), communicates signals from/to the spatial router 300 over a wireless link, such as an LPWAN link or other suitable communications link 310/316. In accordance with one exemplary embodiment, the information may be conveyed as IP packets. Upon receipt by the spatial router 300, the processor 336 analyzes the information packets and uses the priority module 328, queue management module 324, available satellite assessor 340, and interference prevention module 352, to determine which satellite to be used to convey the information to an internet connected ground station 148. Queue management module 324 may establish a new queue for communication with a satellite that is available or is about to become available in a short time. Similarly, when a specific satellite link becomes unavailable, queue management module 32 may associate a queue with another satellite, or if the queue is empty, may optionally dissolve the empty queue.

Available satellite assessor 340 communicates with the processor 336 to utilize stored satellite information (for example in a look-up table, database, etc.) to determine at any time the satellites that may have line of sight towards the drone with the spatial router 300. Interference prevention module 352 is tasked with selecting a subset of the visible/available satellites with which a communication channel can be established without interfering with any unintended receiver(s) such as the receivers of adjacent satellites. The interference prevention module 352 can use a GPS position acquired by the GPS unit 356 of the drone 120 and based on the flight path (e.g., velocity) analyzes the link budget towards each intended satellite receiver as well as the link budget towards unintended satellite receivers and/or incumbent ground receivers.

A general discussion of link budgets can be found at en.wikipedia.org/wiki/Minimum detectable signal (which is incorporated herein by reference in its entirety). In general, the energy from the Boltzmann noise (white ambient noise) increases with the ambient temperature. Since it is white noise, the total amount of energy depends on the bandwidth of the receiver; the higher the bandwidth, the higher the received noise energy.

An exemplary embodiment utilizes spread spectrum and only needs a low bit rate, therefore, the system can detect signals that are set at a threshold at or slightly below a noise level. However, as stated by Shannon Theory, if a higher bit rate is needed, one should use a higher threshold for the intended satellite.

In accordance with one exemplary embodiment, a satellite is determined to be available when the drone can direct an antenna in a direction such that the link budget toward the intended satellite is above a first threshold ensuring a proper communications channel, and the link budget toward any other unintended satellite is below a second threshold ensuring no interference.

For the second threshold (to be used with the unintended receivers) the technique can use 6 dBs below a noise level. So, if the noise level from the web site example is at −92.5 dBm, the second threshold could be set at −98.5 dBm.

As explained in copending related U.S. application Ser. No. 15/455,775, entitled "REDUCED POWER FOR AVOIDANCE OF INTERFERENCE IN WIRELESS COMMUNICATIONS" (which is incorporated herein by reference in its entirety), the interference prevention module 352 may determine a transmission power and/or direction at which the drone should point antenna(s) 364 to establish communication with satellite 368 while preventing interference with unintended receivers such as other satellites or incumbent ground stations (not shown). As one example, the technique can determine a noise floor "interference boundary" (protection zone) based on an antenna transmission and lobe pattern of the associated antennas of systems and based on the particular directions of the antennas, and the expected transmission direction and power of the transmitter. This interference boundary can be used to determine whether a transmission from the spatial router aiming at an intended receiver (e.g., satellite), would exceed a noise floor and thus interfere with the incumbent and unintended incumbent receiver. This allows the antennas to be aimed to avoid interfering with other satellites.

The queue management module 324 may establish one or more message queues 332 (optionally in cooperation with storage/memory/cache 348) to facilitate communication with each available satellite (for which a non-interfering path has been determined). When the processor 336 along with the queue management module 324 selects a specific queue 332 to be transmitted towards satellite 368, the antenna positioning module 344 can control the gimbals (not shown) of the antenna(s) 364 and position the antenna(s) toward the satellite 368 which is associated with a specific queue 332. Alternatively, or in addition, the antenna positioning may be accomplished via beam steering of the transmitted signal to the satellite 368.

These antennas 316 and 364 may be part of the spatial router 300 or otherwise attached to the drone. Similarly, low power communication module 320 and satellite communications module 360 may be part of the router or otherwise independent modules attached to the drone.

In accordance with one exemplary embodiment, the antenna positioning module 344 works in a manner similar to the method described in copending U.S. application Ser. No. 15/581,419, entitled "POINTING AN ANTENNA AT A SIGNAL SOURCE USING AUGMENTED REALITY" (which is incorporated herein by reference in its entirety). The only difference is that while the above application describes a method in which a person is guided to wobble the antenna around a desired direction, an exemplary embodiment provides for the antenna pointing module 344 to wobble the antenna(s) 364 and to maintain the antenna(s) substantially towards the intended satellite or communication peer.

In accordance with yet another exemplary embodiment, as described in greater detail below, the antenna positioning module 344 points the antenna slightly away from the intended satellite in order to prevent interference with unintended incumbent satellites. Copending application Ser. No. 15/611,022, entitled "SELECTIVELY CONTROLLING A DIRECTION OF SIGNAL TRANSMISSION USING ADAPTIVE AUGMENTED REALITY" (which is incorporated herein by reference in its entirety) describes a method for pointing the antenna 364 in such a direction. The only difference is that while the above application describes a method in which a person is guided to wobble the antenna around a desired direction, the antenna positioning module 344 would be responsible to wobble the antenna and to maintain the antenna slightly away from the intended satellite (or the intended communication peer) in order to prevent interference with unintended incumbent satellites.

Although antennas 316 and 364 may be fixed antennas or as antennas which are mounted on a set of gimbals that may position the antenna(s) in a desired direction, those skilled in the art would recognize that other antenna types could also be used such as phased array antennas. The phased array antenna may be a BBFlat Ku-Band phase array from SkyTech™, an X/Ku-Band 8-Element Phased Arrays Based on Single Silicon Chips such as the one described in a paper by Yusuf A. Atesal, Berke Cetinoneri, Kwang-Jin Koh†, and Gabriel M. Rebeiz from the University of California, San Diego, La Jolla, Calif., 92093, USA. U.S. Pat. No. 5,977,910, a "MULTIBEAM PHASED ARRAY ANTENNA SYSTEM", and U.S. Patent Publication 20110291889 A1, entitled "PHASED ARRAY ANTENNA AND A METHOD OF OPERATING A PHASED ARRAY ANTENNA" provide additional examples of antenna technology usable with the current technology, all of which are incorporated herein by reference in their entirety.

Queues are used as a data structure for buffering data wherein data to be stored is the data which is collected from the various devices 304 over the wireless link 312. The queues can operate in FIFO (first-in first-out mode, namely messages are stored in the queue in the order they arrived, and are de-queued from the queue for transmission towards satellite 368 in the same order of arrival. Consequently, messages are stored in specific queue corresponding to the priority of the message as well as the satellite they serve. More information about queues can be found at https://en.wikipedia.org/wiki/Queue_(abstract_data_type)].

Figure 4:
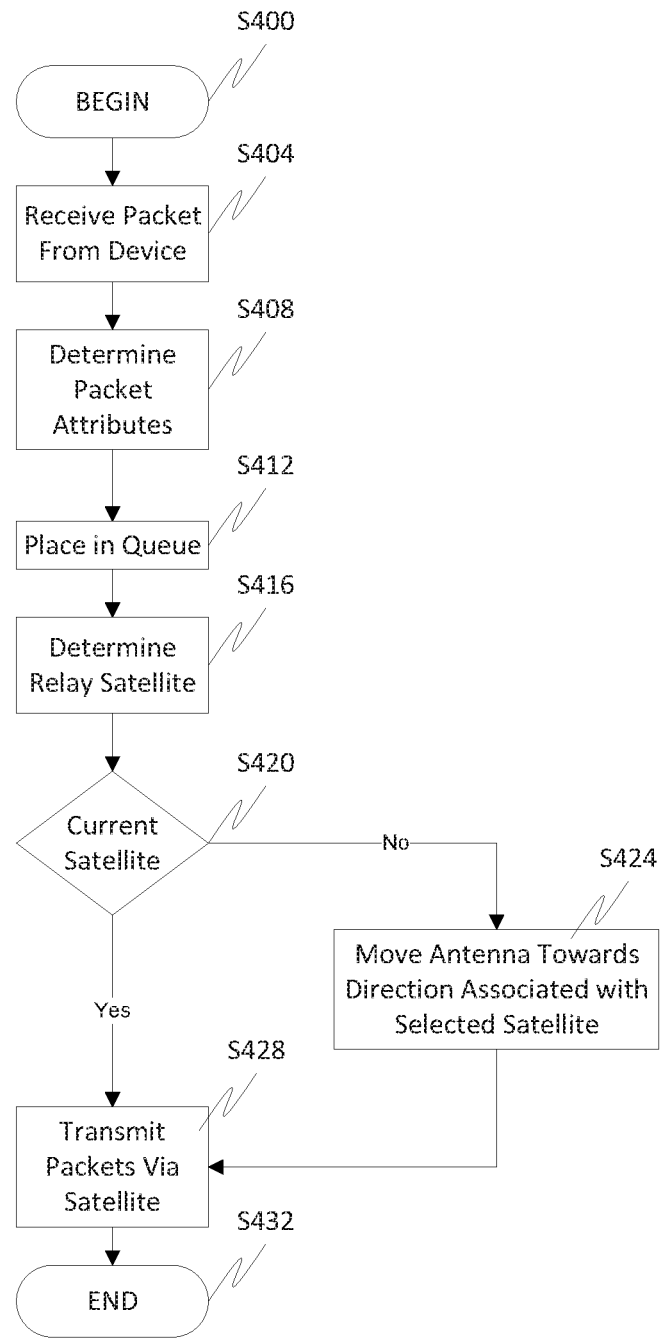
FIG. 4 illustrates an exemplary method for antenna pointing and data transmission in accordance with some embodiments.

FIG. 4 illustrates one of the exemplary processes running on the spatial router. The software that governs this process (as well as the other processes described herein) can be stored in storage device 348 and executed by the processor 336. Control begins in step S400 and continues to step S404 where data, such as an information packet, is received from a device, such as device 304/308. Next, in step S408, the packet attributes are assessed including but not limited to determining the priority of the packet and the proper path/queue including but not limited to the specific satellite to be used for communicating this information.

In accordance with one exemplary embodiment, the attribute may be derived from the address of the intended recipient. This can occur for example when the address of the sender or the address of the intended recipient is identified as a sender or recipient of confidential information (based on address tables which are part of the information stored in memory (storage 348). When such address is identified, the packet can be assigned an attribute of needing to be sent via private/confidential path, which means that the path this packet takes should be only via a private/specific satellite.

In accordance with another exemplary embodiment, the router can check the header of the packets. If it is determined that the packet has RTP (real-time transport protocol) marking, the packet can be assigned an attribute of requiring a service with the shortest delay. As such the packet may be assigned to a queue associated with a low-latency LEO satellite.

In accordance with yet another exemplary embodiment, the IP address of the intended recipient can be mapped into the specific GPS location of the intended recipient using geolocation data from, for example, IP2Location™. IP2Location™ has the ability to determine one or more of a person's country, region, city, latitude and longitude of city, ZIP code, time zone, connection speed, ISP, domain name, IDD country code, area code, weather station code and name, mobile carrier, elevation and usage type information.

Then, the specific path/satellite may be selected based on the GPS location of the recipient. Specifically, when sending a message from the NY area to a European address, the system may classify the packet as heading eastwards and consequently select a satellite that is above the Atlantic Ocean. If, on the other hand, the location data indicates that the recipient resides in California, the system could mark the packet as having an attribute of heading westwards and queue the packet for being serviced by a satellite that is located west of NY.

Then, in step S412, the corresponding satellite is selected and the packet is then queued in a queue associated at least with specific characteristics of the packet.

For example, urgent real-time packets may be directed to a first queue, cost sensitive packets may be directed to a second queue, and private high security packets may be directed to a third queue.

In step S416, the process associates a specific satellite with each queue. If a queue is already associated with a satellite, and the satellite is still available, the process may be omitted. However, if a satellite becomes unavailable because, for example, the drone changed its GPS position or because it was determined that transmission from a new GPS position may interfere with an unintended satellite receiver, the system would select a different satellite as a relay towards an internet enabled ground station.

Next, in step S420 the system assesses whether the system needs to transmit information via a different satellite than the one that the antenna is currently pointing toward. This may occur if the current satellite becomes unavailable, because the process determines that it needs to serve another queue and/or there is not enough time to transmit at least a portion of the associated queue to the satellite before it becomes unavailable.

If the transmission via the current satellite is acceptable, control continues to step S428. Otherwise, control continues to step S424.

In step S424, the antenna may need to be directed to point in a different direction associated with a new satellite. It should be noted that at times the antenna may need to adjust its direction to compensate for the motion of the drone based on a new GPS position. Alternatively, or additionally, the antenna may be continuously moved to compensate for motion of LEO or other non-GEO stationary satellites. Those skilled in the art would recognize that the motion of the antenna may refer to physical motion such as moving motors associated with the antenna gimbals, and/or otherwise the motion may be induced electronically by stewarding the main lobe(s) of the antenna by the phased array control mechanism.

In step S428, and when transmission can continue towards the same satellite, or if the relay satellite has been changed and the antenna has been moved in a new direction to accommodate the newly selected satellite in step S424, transmission of information packets towards the new satellite commences in step S428. Control then continues to step S432 where the control sequence ends. Though not shown in the figure, those skilled in the art would recognize that step 416 through 432 can continue to execute until all of the packets from all of the queues have been transmitted to their destinations.

Figure 5:
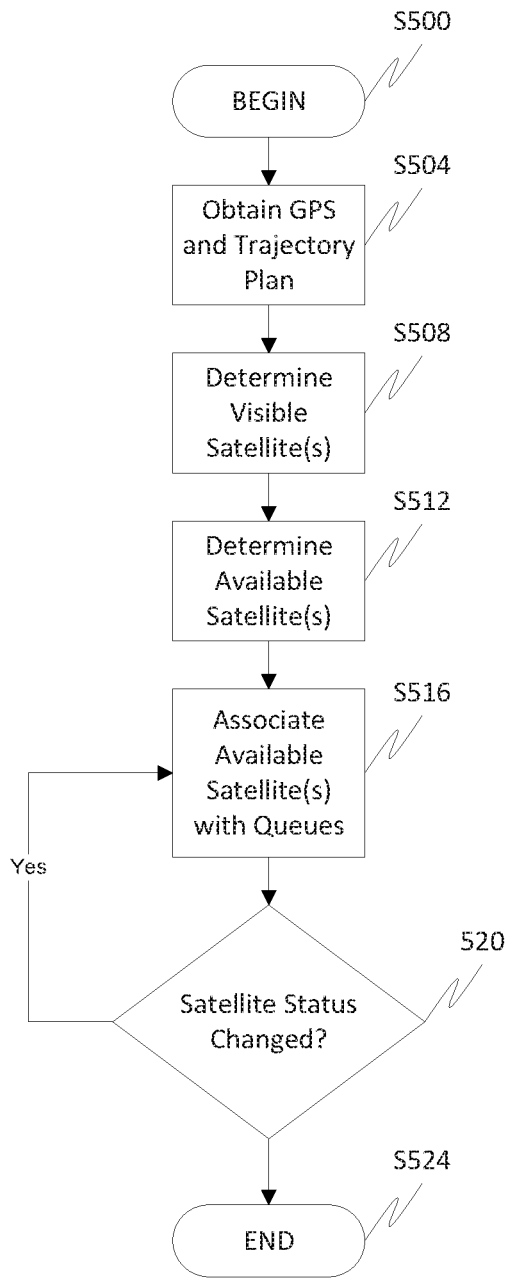
FIG. 5 illustrates an exemplary method for associating queues with satellites in accordance with some embodiments.

FIG. 5 illustrates an exemplary method for associating satellites with queues. Control begins in step S500 and continues to step S504. In step S504, the system obtains a GPS location and flight trajectory plan for the drone. Next, in step S508 it is determined which satellites are visible from the drone's current GPS position. In accordance with an exemplary embodiment, the process uses the planned flight trajectory and assesses how long a particular satellite would remain visible. Then, in step S512, a sub-set of the visible satellites are identified which could be used without interfering with other unintended receivers. A satellite is defined to be available if there is a direction in which the antenna of the spatial router could point such that the link budget towards the intended satellite is above a predetermined first threshold and the link budget towards any other unintended receiver (such as another satellite) is below a predetermined second threshold.

The process of determining which intended receiver, e.g., satellite, is visible and available is described in copending related U.S. application Ser. No. 15/379,023, entitled "AVOIDANCE OF INTERFERENCE IN WIRELESS COMMUNICATIONS", U.S. application Ser. No. 15/379,131, entitled "COMPUTING PROTECTION ZONES FOR AVOIDANCE OF INTERFERENCE IN WIRELESS COMMUNICATIONS", U.S. application Ser. No. 15/455,687, entitled "SERVER PARTICIPATION IN AVOIDANCE OF INTERFERENCE IN WIRELESS COMMUNICATIONS", and U.S. application Ser. No. 15/455,775, entitled "REDUCED POWER FOR AVOIDANCE OF INTERFERENCE IN WIRELESS COMMUNICATIONS", all of which are incorporated by reference. Control then continues to step S516.

In step S516, the direction towards each one of the available satellites is calculated based on the GPS location of the drone and the position of the respective satellite in the sky. An association between each queue and an available satellite is made and in accordance with a specific embodiment, a queue may be determined not to have an appropriate satellite path at that moment and be designated to await the upcoming availability of a specific satellite based on the planned trajectory of the drone and the known position of the GEO satellite or the well-established trajectory of a LEO satellite. For example, a queue that stores classified information may need to wait until a specific satellite which can handle this classified information becomes available. Next, in step S520, the system checks on an ongoing basis if the status of any satellite has changed. Specifically, the process checks if any satellite has become available or alternatively whether any satellite is about to become unavailable. If the process determines that satellite availability has not changed, control continues to step S524 where the control sequence ends. However, if in step S520 it is determined that the status of any satellite has changed (e.g., a new satellite has become available or a specific satellite became unavailable), control jumps back to step S516 where the set of available satellites is associated with the dynamically adjustable queue.

Figure 6:
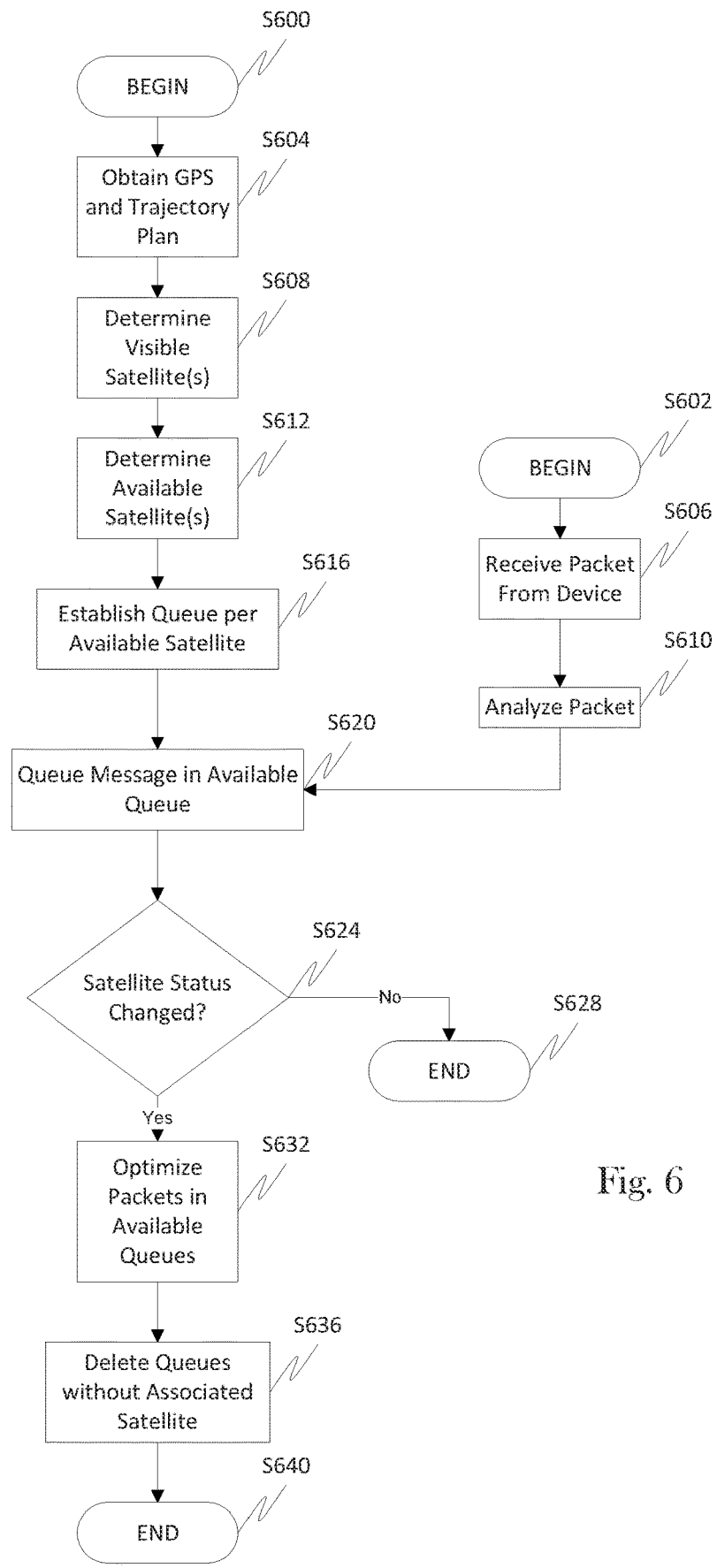
FIG. 6 illustrates an exemplary method for queue management in accordance with some embodiments.

FIG. 6 illustrates an alternative process for associating messages with queues. Control begins in step S600 and continues to step S604. In step S604, the system obtains a GPS location and flight trajectory plan for the drone. Next, in step S608, it is determined which satellites have line of sight towards the drone's current GPS position. In accordance with an exemplary embodiment, the process uses the planned flight trajectory and assesses how long a particular satellite would maintain the line of sight. Then, in step S612, a sub-set of the visible satellites are identified which could be used without interfering with other unintended receivers. A satellite is defined to be available if there is a direction in which the antenna of the spatial router could point such that the link budget towards the intended satellite is above a predetermined first threshold and the link budget towards any other unintended receiver (such as another satellite) is below a predetermined second threshold. Control then continues to step S616.

In step S616, the queue manager can dynamically establish a queue for each satellite which was determined to be available in step S612.

In step S606, a new packet or message arrives from the device/sensor. The packet is analyzed in step S610 and assigned to a specific available queue in step S620. Though not shown in the flowchart, if a suitable buffer is not available, the message may be queued in another buffer associated with specific satellite that may become available in the future. Next, the availability status of the corresponding satellite is continuously monitored in step S624.

When it is determined that the status has not changed, control continues to step S628 where the control sequence ends. However, if it is determined that the availability status of the satellites has changed, the process continues to step S632 where the packets are optimized in available queues. In accordance with one specific exemplary embodiment, (not shown), the packets remain in the specific buffer and await the specific satellite to become available.

For example, if a new satellite becomes available and a new queue has been established in step S616, the system may use the new queue for upcoming messages, or if indicated, it may move specific messages from other existing queues to the new queue. Alternatively, if it is determined that one of the satellites which was associated with a queue is no longer available, the system may move the messages from that queue, or otherwise assign them to another queue. The emptied queue which no longer has any packets in it and is not associated with any satellite can optionally be deleted in step S636. The process then continues to step S640 where the control sequence ends. Though not explicitly shown, the same process can be repeated for all incoming packets/messages from the device/sensor. The process may also be repeated when the GPS location of the drone changes or when the position of the satellite in the sky changes.

As with any traditional router, the queue management process manages the timing and priority of servicing each queue. Unlike traditional routers where routes are assumed to be available at all times, the availability of various satellites may change continuously. This may occur because various satellites may become unavailable when they no longer have line of sight from the drone, or when transmission towards a specific satellite may interfere with another unintended receiver. To this end, the queue manager may stop assigning packets to a specific queue if it determines that the satellite associated with the queue may shortly become unavailable. Alternatively, the queue management process may elevate the priority of servicing a specific queue if is determined that the satellite associated with this queue may become unavailable. This could be based on data stored on the drone, such as in a look-up table, that indicates the position of GEO satellites, or the trajectory parameters of LEO, to facilitate calculating when certain satellites should be available for communication.

Figure 7:
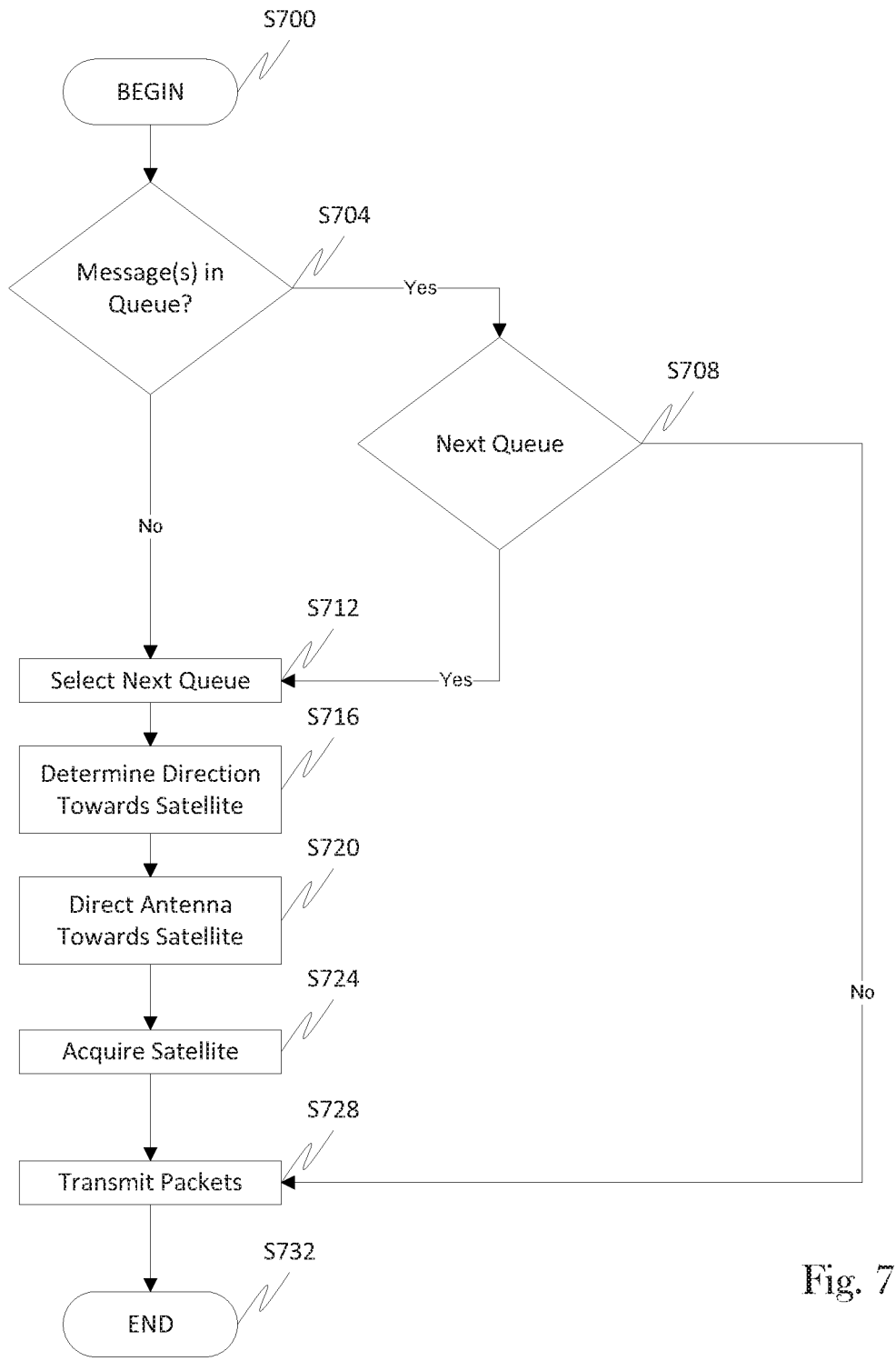
FIG. 7 illustrates an exemplary method of queue management in accordance with some embodiments.

FIG. 7 illustrates an exemplary process of transmitting stored messages from queues and the process of spatial routing which is achieved by moving the main lobe of the antenna(s) towards satellites associated with the different queues. The motion of the antenna can be governed by the antenna positioning module as discussed above.

Control begins in step S700 and continues to step S704. In step S704, the system determines whether there are any additional messages to be sent from the current queue towards the satellite associated with this queue. If there are additional messages, control continues to step S708 where the process determines whether servicing should continue for the current queue or whether to move to servicing the next queue.

One criterion for making this decision is based on checking if the time allocated for sending messages from this specific queue has elapsed. If the time has not yet elapsed, the process continues to step S728 where packet transmission continues towards the current satellite. However, if it is determined in step S704 that the current queue is empty, or step S708 it was determined that it is time to service the next queue, control continues to step S712.

It should be noted that step S708 may monitor specific events such as the need to transmit an urgent message from a different queue. If such an event is detected, step S708 may decide to switch queues and service the queue which has the urgent message.

In step S712 the queue management module selects the next queue to be serviced. If there are no other queues that need to be serviced, the process may pause at this step and wait for an arriving packet to be placed in the appropriate queue. The process may also pause in step S712 if the only queues that have packets need to wait for their associated satellite to become available. Next, in step S716, the process determines the direction in which the antenna needs to be pointed to establish a communication channel towards the satellite associated with the selected queue. As previously discussed, the direction can be selected to ensure proper link budget towards the intended satellite while ensuring that transmission will not interfere with any unintended receiver. The process continues to step S720 where the antenna positioning module directs the antenna to point towards the satellite which is associated with the selected queue that is about to be serviced. Control then continues to step S724.

In step S724 the satellite communications module acquires the intended satellite. As soon as a communication channel is established with satellite, packets from the specific queue can be are transmitted towards the satellite in step S728. After a packet is transmitted in step S728, control continues to step S732 where the control sequence ends. While not shown in the flow-charts, those skilled in the art should recognize that the rather than ending at step 732, the process may loop back to step 704 and continue servicing the various queues as long as there are messages in queue which need to be sent via a satellite towards an internet connected ground station.

Figure 8:
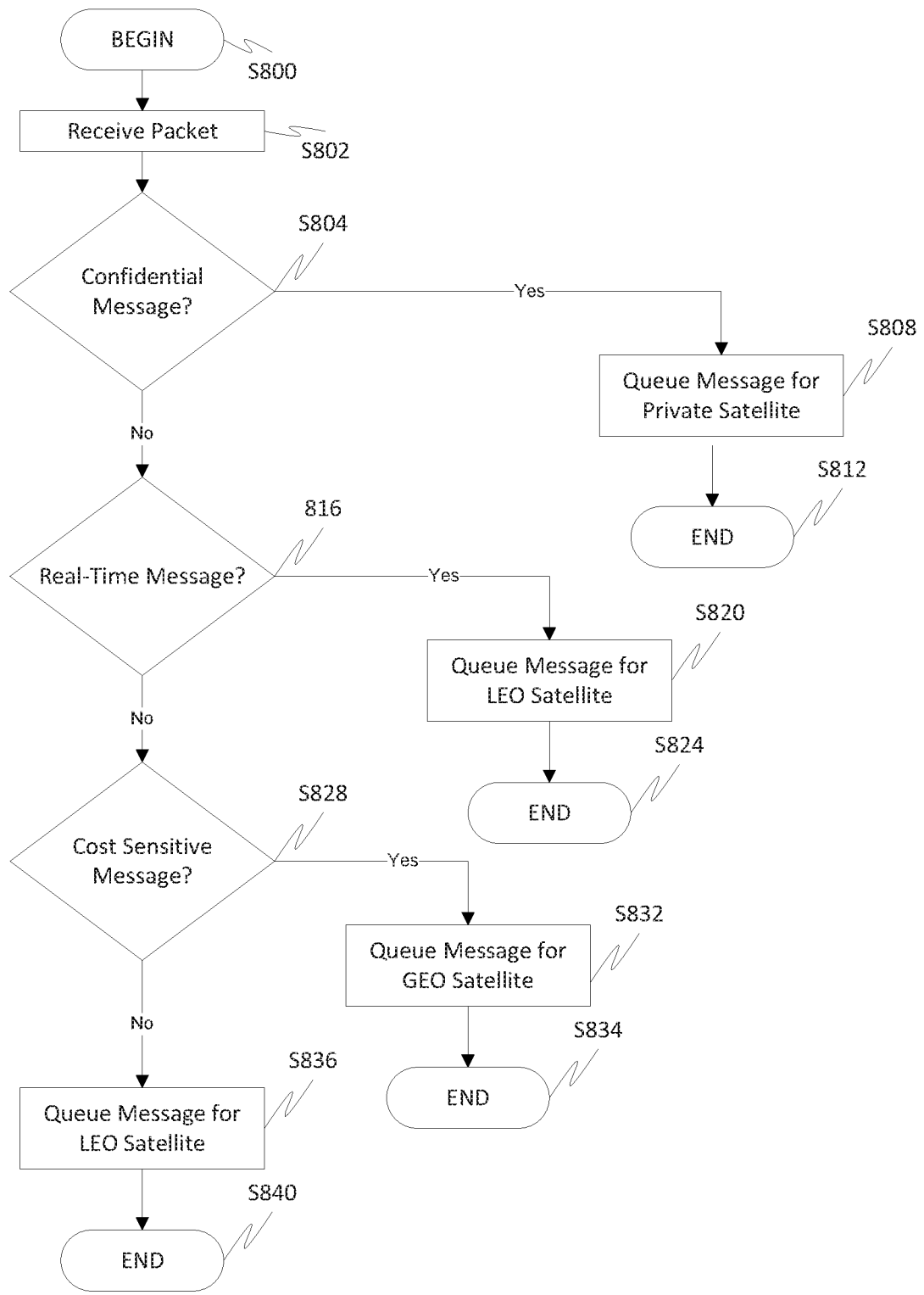
FIG. 8 illustrates an exemplary method of message management in accordance with some embodiments.

FIG. 8 illustrates an exemplary process of queueing an incoming message into one of the dynamic queues associated with a satellite. In accordance with one exemplary embodiment, at least one queue for handling confidential messages may be created, for example, as the system boots up. The GEO and LEO related queues may be created dynamically as the associated satellites become available.

Control begins in step S800 and continues to step S802 when a new packet associated with a specific message is received. Next, in step S804, a determination is made whether the packet is associated with a confidential message that should be sent only via a specific private satellite. If it is determined in that the packet is associated with a confidential message, the process continues to step S808 where the message is queued in a queue intended for one of the available private satellites or is placed in a specific queue awaiting the availability of a specific private satellite. The specific confidential satellite for which the message is queued may be determined by the by length of the queue associated with each one of the private satellites. Confidential messages should wait for a private satellite to become available and should not be handled by other public satellites. Control then continues to step S812 where the control sequence ends.

If it is determined in step S804 that the packet is not associated with a confidential message, in step S816 a determination is made whether the packet is associated with real-time message (or a near real-time message). If the packet is a real-time message, control continues to step S820 where the packet is queued in one of the dynamic queues associated with a LEO satellite. Control then continues to step S824.

However, if it is determined that the message does not require a low latency path, the process continues to step S828.

In step S828 the system determines whether the message is cost sensitive. If it is determined that the message is not cost sensitive, the packet may be queued in one of the dynamic queues associated with a LEO satellite in step S836.

However, if the LEO satellites are all busy handling real-time messages, not shown in the figure, the system may still queue the packet in one of the dynamic queues associated with a GEO satellite. If step S828 determines that the packet is associated with a cost sensitive message, the packet is queued in one of the dynamic queues of GEO satellites. If there are multiple available private, LEO, or GEO satellites, the specific dynamic queue in which the system may queue a specific packet may be determined in a manner that reduces the delay associated with transmitting each packet. Alternatively, the queue in which to place a packet can be determined based on one or more other metrics such a cost, latency, geographical location of the message recipient (not shown in the flow-chart), etc. Control then continues to step S834 where the control sequence ends.

It should be noted that while certain steps within the flowcharts may be optional and the steps shown in the figures are merely examples for illustration, and certain other steps may be included or excluded as desired. Furthermore, while a particular order of the steps is shown, this ordering is merely illustrative, and any suitable arrangement of the steps may be utilized without departing from the scope of the embodiments herein. Moreover, the methods are described separately, certain steps from each procedure may be incorporated into one or more of the other methods, and the various steps are not meant to be mutually exclusive.

In the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11 ad ("IEEE P802.11 ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing or future developed cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols or other communications protocols, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), InfraRed (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), LPWAN, LoRA, Ultra Narrow Band, Random Phase Multipe Access, or the like. Other embodiments may be used in various other devices, systems and/or networks.

Some demonstrative embodiments may be used in conjunction with a WLAN (Wireless Local Area Network), e.g., a Wi-Fi network. Other embodiments may be used in conjunction with any other suitable wireless communication network, for example, a wireless area network, a "piconet", a WPAN, a WVAN, and the like.

Some demonstrative embodiments may be used in conjunction with a wireless communication network communicating over a frequency band of 5 GHz and/or 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, the technology may be useful in the unlicensed spectrum.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or satellite communications system(s) described herein.

Thus, it should be appreciated that the components of the system can be combined into one or more devices, or split between devices, such as a transceiver, a device, an IoT sensor, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a spatial router, a node on the network, a domain management device, a network operation or management device, a transceiver(s), a station, an access point(s), a communications unit, or some combination thereof. Similarly, one or more of the functional portions of the system could be distributed between a transceiver and an associated computing device/system.

Furthermore, it should be appreciated that the various links 5, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to LPWAN communications. However, it should be appreciated, that in general, portions of the systems and methods herein will work equally well for any type of communication system in any environment utilizing any one or more protocols including wired communications, wireless communications, powerline communications, coaxial cable communications, fiber optic communications, and the like.

To avoid unnecessarily obscuring the present disclosure, the description omits well-known structures and devices that may be shown in block diagram form or otherwise summarized.

Exemplary aspects are directed toward:

A wireless spatial router, comprising:
a controller;
a memory in communication with the controller including storage for one or more queues;
a queue management module that dynamically determines and creates a number of queues associated with available or to be available satellites in the memory;
a priority module that determines in which queue among the one or more queues to assign a packet, the determination at least based on one or more attributes of the packet; and
a satellite communications module that receives the packet from a queue currently being serviced and transmits the received packet to a satellite.

Any one or more of the above aspects, wherein one of the dynamic determined queues is established whenever a new satellite becomes available for communication.

Any one or more of the above aspects, further comprising an available satellite assessor to determine available satellites or aircraft for communication with the spatial router.

Any one or more of the above aspects, further comprising an antenna positioning module and drive mechanism to point an antenna at one or more different satellites.

Any one or more of the above aspects, wherein the router includes a communications link to the ground and a communications link to one or more other satellites or aircraft.

Any one or more of the above aspects, wherein an empty queue associated with an unavailable satellite is reclaimed and erased.

Any one or more of the above aspects, wherein the pointing is a spatial direction and is time varying.

Any one or more of the above aspects, wherein a priority of a queue is modified to reflect a time remaining time that an associated satellite will be available for communication.

Any one or more of the above aspects, wherein the router is carried on a drone.

Any one or more of the above aspects, wherein a satellite is determined to be available when the drone can direct an antenna in a direction such that a link budget toward an intended satellite is above a first threshold, and a link budget toward any other unintended satellite is below a second threshold.

Any one or more of the above aspects, wherein servicing a new queue involves steering an antenna of the drone in a new spatial direction towards a different satellite.

Any one or more of the above aspects, when a direction of the drone antenna is continuously adjusted to compensate for the relative trajectory of the drone and a satellite.

A non-transitory information storage media having stored thereon one or more instructions, that when executed by one or more processors, cause to be performed a method in a spatial router comprising:
establishing storage for one or more queues;
dynamically determining and creating a number of queues associated with available or to be available satellites in a memory;
determining in which queue to assign a received packet, the determination at least based on one or more attributes of the packet; and
obtaining the packet from a queue that is currently being serviced and transmitting that packet to a satellite.

A spatial router comprising:
means for storing one or more queues;
means for dynamically determining and creating a number of queues associated with available or to be available satellites in the memory;
means for determining in which queue a packet should be placed, the determination at least based on one or more attributes of the packet; and
means for receiving the packet from a queue that is currently being serviced and forwarding that packet to a satellite.

A method for relating information from a device or sensor to the Internet comprising:
creating and updating one or more dynamic queues based at least on satellite availability;
receiving, at a spatial router that includes memory, dynamically created queues and a transceiver, a packet;
determining one or more attributes associated with the packet;
placing the packet in one of the dynamically created queues based on the one or more attributes and satellite availability;
transmitting the packet to a satellite, the satellite relaying the packet to the Internet via a ground station.

Any one or more of the above aspects, wherein one of the dynamic created queues is established whenever a new satellite becomes available for communication.

Any one or more of the above aspects, further comprising determining available satellites or aircraft for communication with the spatial router.

Any one or more of the above aspects, further comprising pointing an antenna at one or more different satellites.

Any one or more of the above aspects, wherein an empty queue associated with an unavailable satellite is reclaimed and erased.

Any one or more of the above aspects, further comprising pointing an antenna at a satellite, wherein the pointing is a spatial direction and is time varying.

Any one or more of the above aspects, wherein a priority of a queue is modified to reflect a time remaining time that an associated satellite will be available for communication.

A system on a chip (SoC) including any one or more of the above aspects.

One or more means for performing any one or more of the above aspects.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as a spatial router, or collocated on a particular node/element(s) of a distributed network, such as a communications network. As will be appreciated from the following description, and for reasons of computational efficiency, the components of the system can be arranged at any location within a distributed network without affecting the operation of the system. For example, the various components can be located in a transceiver, a spatial router, a station, a sensor, a management device, or some combination thereof. Similarly, one or more functional portions of the system could be distributed between a transceiver and an associated computing device.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for communication. Additionally, the exemplary techniques illustrated herein are not limited to the specifically illustrated embodiments but can also be utilized with the other exemplary embodiments and each described feature is individually and separately claimable.

The above-described system can be implemented or partially implemented on a wireless telecommunications device (s)/system, such an IEEE 802.11 transceiver, a satellite communications transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11 ax, Wi-Fi, LTE, 4G, Bluetooth®, WirelessHD, 3GPP, Wireless LAN, WiMAX, DensiFi SIG, Unifi SIG, 3GPP LAA (licensed-assisted access), and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJS™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhancing and improving communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A wireless spatial router mountable on a movable device, comprising:
a controller;
a memory in communication with the controller including storage for one or more queues;
a queue management module in communication with the controller that dynamically determine and create a number of queues in the memory associated with available or to be available satellites, an amount of information stored in the number of queues limited to margins and information that can be sent while a satellite is available, and wherein the satellite is determined to be available when the router can direct an antenna in a direction such that a link budget toward the available satellite is above a first threshold ensuring a proper communications channel, and a link budget toward any other unintended receiver is below a second threshold ensuring no interference, the availability further based on: a line of sight of the spatial router to the available satellite and the to be available satellite, and an amount of time to transmit at least a portion of the associated queue to the available satellite before the available satellite becomes unavailable due to a loss of the line of sight;
a priority module in communication with the controller that determine in which queue among the one or more queues to assign a packet, the determination at least based on one or more attributes of the packet; and
a satellite communications module that receives the packet from a queue currently being serviced and communicates the received packet via a transmitter to the available satellite.

2. The router of claim 1, wherein one of the dynamic determined queues is established whenever a new satellite becomes available for communication.

3. The router of claim 1, further comprising an available satellite assessor to determine available satellites or aircraft for communication with the spatial router.

4. The router of claim 1, further comprising an antenna positioning module and drive mechanism to point an antenna at one or more different satellites.

5. The router of claim 1, wherein the router includes a communications link to the ground and a communications link to one or more other satellites or aircraft.

6. The router of claim 1, wherein an empty queue associated with an unavailable satellite is reclaimed and erased.

7. The router of claim 4, wherein the pointing is a spatial direction and is time varying.

8. The router of claim 1, wherein a priority of a queue is modified to reflect a remaining time that an associated satellite will be available for communication before a loss of line of sight.

9. The router of claim 1, wherein the router is carried on a drone.

10. The router of claim 9, wherein:
a satellite is determined to be available when the drone can direct an antenna in a direction such that a link budget toward an intended satellite is above a first threshold, and a link budget toward any other unintended receiver is below a second threshold, and
when due to the motion of the movable device, a satellite may become unavailable because transmitting towards that satellite may result in link budget towards an unintended receiver larger than a predetermined second threshold.

11. The router of claim 9, wherein servicing a new queue involves steering an antenna of the drone in a new spatial direction towards a different satellite.

12. The router of claim 9, when a direction of the drone antenna is continuously adjusted to compensate for the relative trajectory of the drone and a satellite.

13. A non-transitory information storage media having stored thereon one or more instructions, that when executed by one or more processors, cause to be performed a method in a spatial router comprising:
establishing storage for one or more queues;
dynamically determining and creating a number of queues in the memory associated with available or to be available satellites, an amount of information stored in the number of queues limited to margins and information that can be sent while a satellite is available, and wherein the satellite is determined to be available when the router can direct an antenna in a direction such that a link budget toward the available satellite is above a first threshold ensuring a proper communications channel, and a link budget toward any other untended receiver is below a second threshold ensuring no interference, the availability further based on: a line of sight of the spatial router to the available satellite and the to be available satellite, and an amount of time to transmit at least a portion of the associated queue to the available satellite before the available satellite becomes unavailable due to a loss of the line of sight;
determining in which queue to assign a received packet, the determination at least based on one or more attributes of the packet;
obtaining the packet from a queue that is currently being serviced; and
communicating that packet to a satellite.

14. A spatial router comprising:
means for storing one or more queues;
means for dynamically determining and creating a number of queues in the memory associated with available or to be available satellites, an amount of information stored in the number of queues limited to margins and information that can be sent while a satellite is available, and wherein the satellite is determined to be available when the router can direct an antenna in a direction such that a link budget toward the available satellite is above a first threshold ensuring a proper communications channel, and a link budget toward any other unintended receiver is below a second threshold ensuring no interference, the availability further based on: a line of sight of the spatial router to the available satellite and the to be available satellite, and an amount of time to transmit at least a portion of the associated queue to the available satellite before the available satellite becomes unavailable due to a loss of the line of sight;

means for determining in which queue a packet should be placed, the determination at least based on one or more attributes of the packet; and means for receiving the packet from a queue that is currently being serviced and forwarding that packet to a satellite.

15. A method for relaying information from a device or sensor to the Internet comprising:

creating and updating one or more dynamic queues based at least on satellite availability, an amount of information stored in the number of queues limited to margins and information that can be sent while a satellite is available, and wherein the satellite is determined to be available when the router can direct an antenna in a direction such that a link budget toward the available satellite is above a first threshold ensuring a proper communications channel, and a link budget toward any other unintended receiver is below a second threshold ensuring no interference, the availability further based on, a line of sight of the spatial router to the available satellite and the to be available satellite, and an amount of time to transmit at least a portion of the associated queue to the available satellite before the available satellite becomes unavailable due to a loss of the line of sight;

receiving, at the spatial router that includes memory, a packet;

determining one or more attributes associated with the packet;

placing the packet in one of the dynamically created queues based on the one or more attributes and satellite availability;

communicating the packet to a satellite, the satellite relaying the packet to the Internet via a ground station.

16. The method of claim 15, wherein one of the dynamic created queues is established whenever a new satellite becomes available for communication.

17. The method of claim 15, further comprising determining available satellites or aircraft for communication with the spatial router.

18. The method of claim 15, further comprising pointing an antenna at one or more different satellites.

19. The method of claim 15, wherein an empty queue associated with an unavailable satellite is reclaimed and erased.

20. The method of claim 15, further comprising pointing an antenna at a satellite, wherein the pointing is a spatial direction and is time varying.

21. The method of claim 15, wherein a priority of a queue is modified to reflect a remaining time that an associated satellite will be available for communication before a loss of line of sight.

* * * * *